(12) United States Patent
Uchiyama et al.

(10) Patent No.: US 9,731,778 B2
(45) Date of Patent: Aug. 15, 2017

(54) VEHICULAR STRAIGHTENING DEVICE

(71) Applicant: TOYOTA JIDOSHA KABUSHIKI KAISHA, Toyota-shi (JP)

(72) Inventors: Eiichi Uchiyama, Toyota (JP); Kunihiro Kobayashi, Anjo (JP); Kazuhide Asano, Toyota (JP); Katsumi Miyashita, Toyota (JP); Hiroto Furuya, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 15 days.

(21) Appl. No.: 14/786,736

(22) PCT Filed: Apr. 24, 2013

(86) PCT No.: PCT/JP2013/062117
§ 371 (c)(1),
(2) Date: Oct. 23, 2015

(87) PCT Pub. No.: WO2014/174620
PCT Pub. Date: Oct. 30, 2014

(65) Prior Publication Data
US 2016/0068203 A1    Mar. 10, 2016

(51) Int. Cl.
*B62D 37/02*    (2006.01)
*B62D 25/20*    (2006.01)
*B62D 35/02*    (2006.01)

(52) U.S. Cl.
CPC ............ *B62D 37/02* (2013.01); *B62D 25/20* (2013.01); *B62D 35/02* (2013.01)

(58) Field of Classification Search
CPC ........ B62D 37/02; B62D 25/20; B62D 35/02; B62D 35/001; B62D 35/007; B62D 35/00
See application file for complete search history.

(56) References Cited

U.S. PATENT DOCUMENTS 5,511,847 A * 4/1996 Weisbarth ............... B60C 23/18
296/180.1

FOREIGN PATENT DOCUMENTS

DE    23 33 853 A1    1/1975
EP    2 039 595    3/2009
(Continued)

OTHER PUBLICATIONS

International Search Report issued May 28, 2013, in PCT/JP2013/062117 filed Apr. 24, 2013.

*Primary Examiner* — Glenn Dayoan
*Assistant Examiner* — Melissa A Black
(74) *Attorney, Agent, or Firm* — Oblon, McClelland, Maier & Neustadt, L.L.P.

(57) ABSTRACT

A front straightening portion is formed at a front portion of a main body portion of a spat. In the front straightening portion, a front inclined surface is inclined backward with respect to a vehicle with decrease in distance to a lower side of the vehicle in a lateral view, and front lateral surfaces extend forward with respect to the vehicle from both end portions of the front inclined surface in a vehicle width direction, respectively. A traveling wind that hits the front lateral surfaces flows toward the front inclined surface side, and is caused to flow out downward with respect to the vehicle from the front straightening portion together with a traveling wind. The flow velocities of the traveling winds increase, the air resistance of the vehicle can be reduced, operation stability of the vehicle can be enhanced, and riding comfort performance of the vehicle can be enhanced.

5 Claims, 7 Drawing Sheets

(56) References Cited

FOREIGN PATENT DOCUMENTS

| JP | 2001 180530 | 7/2001 |
| JP | 2006 69396 | 3/2006 |
| JP | 2006 327281 | 12/2006 |
| JP | 2007 30549 | 2/2007 |
| JP | 2011 121528 | 6/2011 |
| JP | 2011 131679 | 7/2011 |
| JP | 2012 86657 | 5/2012 |

* cited by examiner

000
VEHICULAR STRAIGHTENING DEVICE

TECHNICAL FIELD

The invention relates to a vehicular straightening device.

BACKGROUND ART

A tire deflector (a spat) described in Patent Document 1 shown below is arranged outside an engine undercover in a vehicle width direction. Concretely, an inclined surface is formed on the engine undercover at an outer end portion thereof in the vehicle width direction, and the tire deflector is arranged behind this inclined surface with respect to a vehicle and outside this inclined surface in the vehicle width direction. Then, when the vehicle travels, a traveling wind flowing outside the engine undercover in the vehicle width direction hits the inclined surface and the tire deflector. Therefore, the entire traveling wind is restrained from hitting the tire deflector. Thus, a Cd value (an air resistance coefficient) of the vehicle is restrained from deteriorating.

RELATED TECHNICAL DOCUMENTS

Patent Documents

Patent Document 1: Japanese Patent Application Publication No. 2012-086657 (JP 2012-086657 A)
Patent Document 2: Japanese Patent Application Publication No. 2006-069396 (JP 2006-069396 A)
Patent Document 3: Japanese Patent Application Publication No. 2007-030549 (JP 2007-030549 A)
Patent Document 4: Japanese Patent Application Publication No. 2006-327281 (JP 2006-327281 A)

SUMMARY OF THE INVENTION

Problem to be Solved by the Invention

However, with the structure as described above, although the inclined surface and the tire deflector restrain the air resistance of the vehicle from deteriorating, the operation stability and riding comfort performance of the vehicle are not taken into account. Therefore, there is a room for improvement in the aforementioned structure in this respect.

In view of the aforementioned fact, it is an object of the invention to provide a vehicular straightening device that can enhance operation stability and riding comfort performance while reducing the air resistance.

Means for Solving the Problem

A vehicular straightening device according to a first aspect of the invention is equipped with a main body portion and a front straightening portion. The main body portion is provided in front of a wheel with respect to a vehicle at a lower portion of the vehicle, and is protruded downward with respect to the vehicle from an underfloor. The front straightening portion is formed at a front portion of the main body portion, and straightens a traveling wind hitting the front portion toward a center side of the front portion in a vehicle width direction and causes the traveling wind to flow out downward with respect to the vehicle.

With the vehicular straightening device according to the first aspect of the invention, the main body portion is provided in front of the wheel with respect to the vehicle at the lower portion of the vehicle. This main body portion is protruded downward with respect to the vehicle from the underfloor, and the front straightening portion is formed at the front portion of the main body portion. It should be noted herein that the front straightening portion straightens a traveling wind hitting the front portion of the main body portion toward the center side of the front portion in the vehicle width direction, and causes the traveling wind to flow out downward with respect to the vehicle. That is, upon hitting the front portion of the main body portion at the time of traveling of the vehicle, the traveling wind is straightened toward the center side of the front straightening portion in the vehicle width direction, and is caused to flow out downward with respect to the vehicle mainly from the lower end of the central portion of the front straightening portion in the vehicle width direction.

Therefore, the flow velocity of the traveling wind caused to flow out downward with respect to the vehicle from the lower end of the front straightening portion can be increased. Thus, the traveling wind caused to flow out from the lower end of the front straightening portion is restrained from flowing into the rear side of the main body portion with respect to the vehicle. Therefore, the traveling wind is restrained from hitting the wheel and the like. Besides, the traveling wind caused to flow out downward from the lower end of the front straightening portion flows downward with respect to the vehicle, engulfing the traveling wind flowing backward with respect to the vehicle below the main body portion with respect to the vehicle. As a result, the traveling wind flowing backward with respect to the vehicle below the main body portion with respect to the vehicle is also restrained from hitting the wheel and the like. Owing to the foregoing, the air resistance of the vehicle can be reduced.

Besides, the flow velocity of the traveling wind caused to flow out downward with respect to the vehicle from the lower end of the front straightening portion increases, so a force lifting the vehicle upward (a buoyant force) is applied to the vehicle. Thus, for example, the buoyant force and the gravitational force of the vehicle are counterbalanced by each other, so the operation stability of the vehicle at the time of straight traveling of the vehicle can be enhanced.

Furthermore, this buoyant force is applied to the vehicle, so the vehicle is restrained from fluctuating in the vertical direction. In other words, the posture of the vehicle is restrained from changing in the vertical direction. As a result, the riding comfort performance of the vehicle can be enhanced.

A vehicular straightening device according to a second aspect of the invention is obtained by modifying the vehicular straightening device according to the first aspect of the invention such that a central portion of the front straightening portion in the vehicle width direction is a front inclined surface that is inclined backward with respect to the vehicle with decrease in distance to a lower side of the vehicle in a lateral view, and that both lateral portions of the front straightening portion in the vehicle width direction are front lateral surfaces that extend forward with respect to the vehicle from both end portions of the front inclined surface in the vehicle width direction respectively.

With the vehicular straightening device according to the second aspect of the invention, the front straightening portion is configured to include the front inclined surface that constitutes the central portion in the vehicle width direction, and the front lateral surfaces that constitute both the lateral portions in the vehicle width direction respectively. Then, the front inclined surface is inclined backward with respect to the vehicle with decrease in distance to the lower side of the vehicle in a lateral view. The front lateral surfaces extend forward with respect to the vehicle from both the end portions of the front inclined surface in the vehicle width direction. That is, the front straightening portion is formed in the shape of a concavity that is opened forward with respect to the vehicle in a plan view.

Therefore, the traveling wind that has hit the front inclined surface flows downward with respect to the vehicle along the front inclined surface. On the other hand, the traveling wind that has hit the front lateral surfaces flows toward the front inclined surface side (the center side of the front straightening portion in the vehicle width direction) along the front lateral surfaces, and merges with the traveling wind flowing along the front inclined surface. Thus, with a simple configuration, the traveling wind hitting the front straightening portion can be straightened toward the center side of the front straightening portion in the vehicle width direction, and can be caused to flow out downward with respect to the vehicle from the lower end of the front straightening portion.

A vehicular straightening device according to a third aspect of the invention is obtained by modifying the vehicular straightening device according to the second aspect of the invention such that a width dimension of the front inclined surface at a lower end thereof is set smaller than a width dimension of the front inclined surface at an upper end thereof.

With the vehicular straightening device according to the third aspect of the invention, the width dimension of the front inclined surface at the lower end thereof is set smaller than the width dimension of the front inclined surface at the upper end thereof. Therefore, the flow velocity of the traveling wind flowing downward with respect to the vehicle along the front inclined surface increases due to a Venturi effect. Accordingly, the flow velocity of the traveling wind caused to flow out downward with respect to the vehicle from the lower end of the front inclined surface can be further increased. Thus, the traveling wind flowing around the main body portion is drawn toward the front straightening portion, so the traveling wind caused to flow out from the lower end of the front inclined surface can be further restrained from flowing into the rear side of the main body portion with respect to the vehicle. As a result, the air resistance of the vehicle can be effectively reduced.

A vehicular straightening device according to a fourth aspect of the invention is obtained by modifying the vehicular straightening device according to the second or third aspect of the invention such that the front inclined surface is formed in a shape of a curved surface that is convex diagonally upward and backward with respect to the vehicle in a lateral view.

With the vehicular straightening device according to the fourth aspect of the invention, the front inclined surface is formed in the shape of a curved surface that is convex diagonally upward and backward with respect to the vehicle in a lateral view. Therefore, the traveling wind can be efficiently caused to flow downward with respect to the vehicle along the front inclined surface.

A vehicular straightening device according to a fifth aspect of the invention is obtained by modifying the vehicular straightening device according to any one of the second to fourth aspects of the invention such that each of the front lateral surfaces is formed in a shape of a curved surface that is convex diagonally backward and outward in the vehicle width direction in a plan view.

With the vehicular straightening device according to the fifth aspect of the invention, each of the front lateral surfaces is formed in the shape of a curved surface that is convex diagonally backward and outward in the vehicle width direction in a plan view. Therefore, the traveling wind can be efficiently caused to flow toward the center side of the front straightening portion in the vehicle width direction along each of the front lateral surfaces.

A vehicular straightening device according to a sixth aspect of the invention is obtained by modifying the vehicular straightening device according to any one of the second to fifth aspects of the invention such that a rear straightening portion is formed at a rear portion of the main body portion, that the rear straightening portion is configured to include a rear inclined surface, and that the rear inclined surface is arranged behind the front inclined surface with respect to the vehicle, and is inclined backward with respect to the vehicle with decrease in distance to an upper side of the vehicle in a lateral view.

With the vehicular straightening device according to the sixth aspect of the invention, for example, even when part of the traveling wind caused to flow out from the lower end of the front straightening portion (the front inclined surface) flows in an engulfing manner into the rear side of the main body portion with respect to the vehicle, the traveling wind can be restrained from hitting the wheel and the like. That is, if part of the traveling wind caused to flow out from the lower end of the front straightening portion (the front inclined surface) flows in an engulfing manner into the rear side of the main body portion with respect to the vehicle, the traveling wind is adsorbed by the rear inclined surface, and flows toward the lower end of the rear inclined surface along the rear inclined surface. Then, when the traveling wind reaches the lower end of the rear inclined surface, the flow velocity of the traveling wind decreases, and the traveling wind is converged at the lower end portion of the rear inclined surface. Thus, the traveling wind that has flowed into the rear side of the main body portion with respect to the vehicle can be restrained from hitting the wheel and the like.

A vehicular straightening device according to a seventh aspect of the invention is obtained by modifying the vehicular straightening device according to any one of the second to sixth aspects of the invention such that a pair of the main body portions are provided symmetrically with respect to a center of the vehicle in the vehicle width direction.

With the vehicular straightening device according to the seventh aspect of the invention, the pair of the main body portions are provided symmetrically with respect to the center of the vehicle in the vehicle width direction. Therefore, for example, the traveling posture of the vehicle can be stabilized with respect to rolling of the vehicle. That is, when the flow velocity of the traveling wind caused to flow out downward with respect to the vehicle from the front straightening portion increases as described above, so the force lifting the vehicle (the buoyant force) is applied to the vehicle. However, at the time of rolling of the vehicle, the position of the center of buoyancy moves as the posture of the vehicle changes. Then, when an angular moment is applied to the vehicle at the time of rolling of the vehicle, a restoring force is applied to a center of inclination (a metacenter). Therefore, the vehicle is about to reassume its original posture due to this restoring force, so the traveling posture of the vehicle can be stabilized with respect to rolling of the vehicle.

Effects of the Invention

The vehicular straightening device according to the first aspect of the invention makes it possible to enhance the operation stability and the riding comfort performance while reducing the air resistance.

The vehicular straightening device according to the second aspect of the invention makes it possible to straighten the traveling wind hitting the front straightening portion toward the center side of the front straightening portion in the vehicle width direction, and to cause this traveling wind to flow out downward with respect to the vehicle from the lower end of the front straightening portion, with a simple configuration.

The vehicular straightening device according to the third aspect of the invention makes it possible to effectively reduce the air resistance of the vehicle.

The vehicular straightening device according to the fourth aspect of the invention makes it possible to efficiently cause the traveling wind to flow downward with respect to the vehicle along the front inclined surface.

The vehicular straightening device according to the fifth aspect of the invention makes it possible to efficiently cause the traveling wind to flow toward the center side of the front straightening portion in the vehicle width direction along each of the front lateral surfaces.

The vehicular straightening device according to the sixth aspect of the invention makes it possible to restrain the traveling wind caused to flow out from the lower end of the front straightening portion from hitting the wheel and the like, for example, even if part of the traveling wind flows in an engulfing manner into the rear side of the main body portion with respect to the vehicle.

The vehicular straightening device according to the seventh aspect of the invention makes it possible to stabilize the traveling posture of the vehicle with respect to rolling of the vehicle.

MODES FOR CARRYING OUT THE INVENTION

First Embodiment

Figure 1:
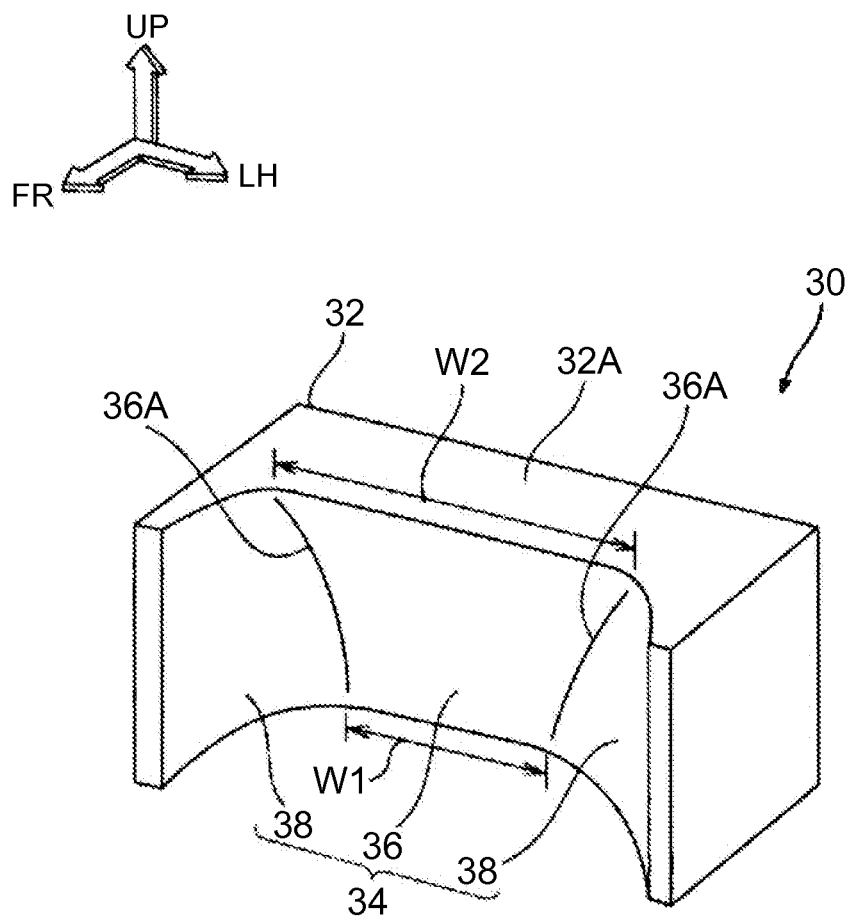
FIG. 1 is a perspective view showing a spat according to a first embodiment of the invention as viewed diagonally from in front of a left side of a vehicle.

Spats 30 as vehicular straightening devices according to the first embodiment of the invention will be described using FIGS. 1 to 4. Incidentally, arrows FR, LH, and UP, which are appropriately shown in the drawings, indicate a forward direction with respect to a vehicle, a leftward direction (one side in a vehicle width direction) with respect to the vehicle, and an upward direction with respect to the vehicle, respectively.

Figure 2:
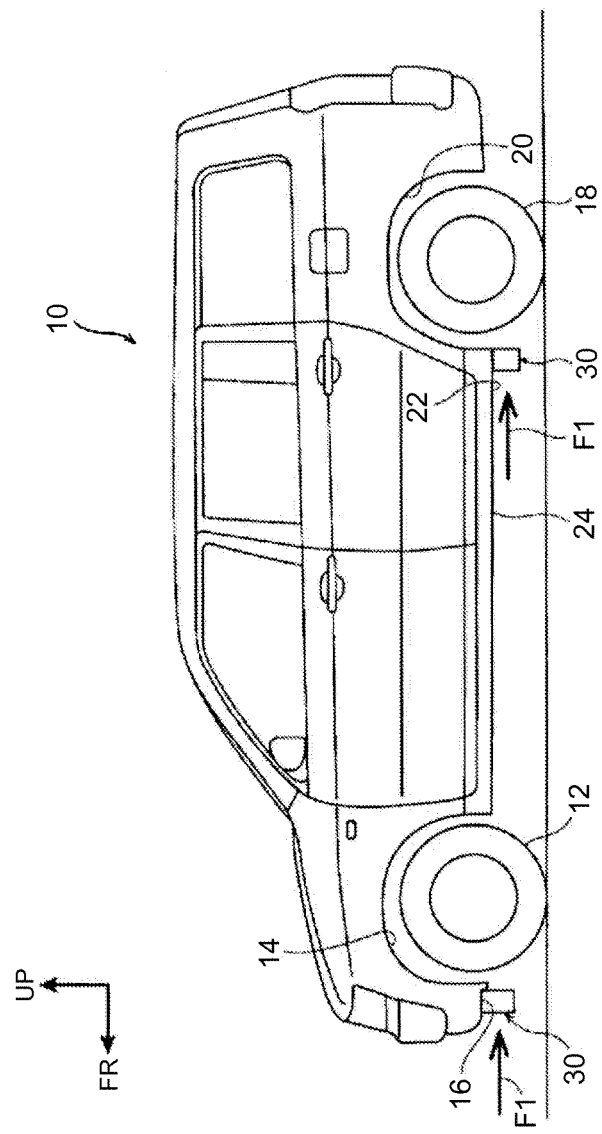
FIG. 2 is a lateral view showing the vehicle to which the spat shown in FIG. 1 is applied, as viewed from the left side of the vehicle.
Figure 3:
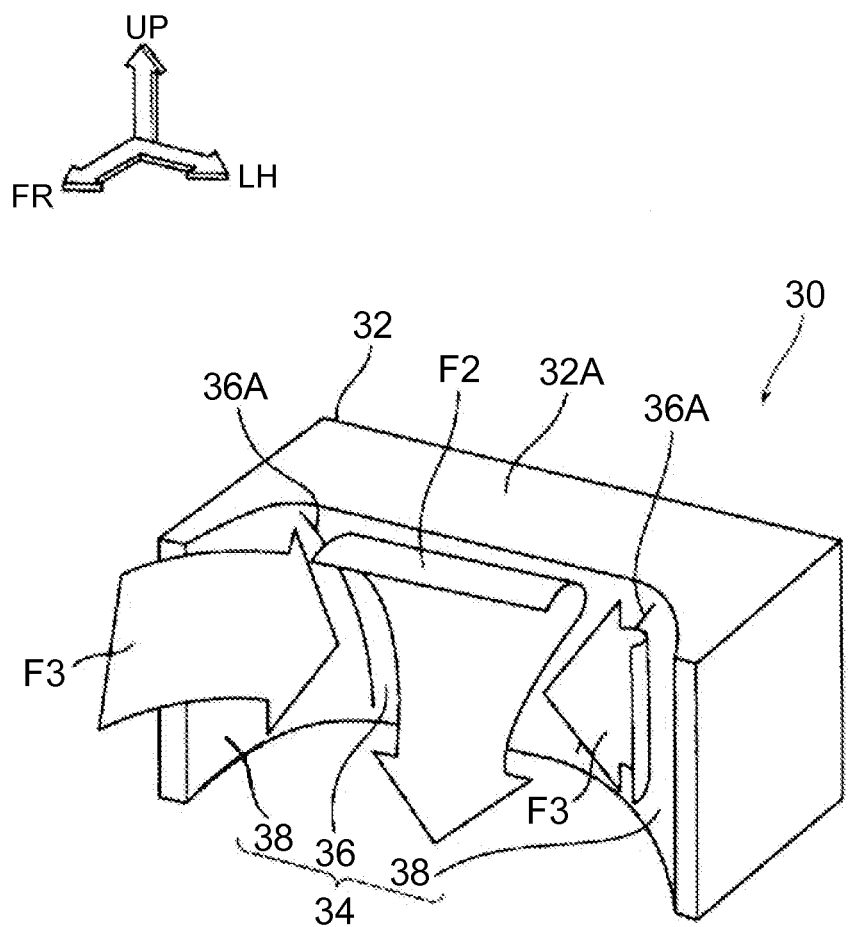
FIG. 3 is a perspective view showing the flow of a traveling wind that has hit a front straightening portion of the spat shown in FIG. 1, as viewed diagonally from in front of the left side of the vehicle.

As shown in FIG. 2, the spats 30 are applied to a lower portion of a vehicle (an automobile) 10. A pair of front tires 12 as "wheels" are provided at a front portion of this vehicle 10 (only the front tire 12 that is provided on a left side of the vehicle is shown in FIG. 2). A front fender liner 14 is arranged radially outward of each of the front tires 12. This front fender liner 14 is substantially formed in the shape of an arch-like plate that is opened downward with respect to the vehicle in a lateral view, and covers an upper portion of the front tire 12 from above the vehicle. Besides, although not shown in the drawing, a front end portion of the fender liner 14 is flexed forward with respect to the vehicle with a board thickness direction being a vertical direction of the vehicle, and is arranged in front of the front tire 12 with respect to the vehicle. Thus, the front end portion of the front fender liner 14 constitutes an underfloor 16 in front of the front tire 12 with respect to the vehicle.

Besides, a pair of rear tires 18 as "wheels" are provided at a rear portion of the vehicle 10 (only the rear tire 18 that is provided on the left side of the vehicle is shown in FIG. 2), and a rear fender liner 20 is arranged radially outward of each of the rear tires 18. This rear fender liner 20 is substantially formed in the shape of an arch-like plate that is opened downward with respect to the vehicle in a lateral view, and covers an upper portion of the rear tire 18 from above the vehicle. Besides, a front end portion of the rear fender liner 20 is linked with a rocker 24 and the like that constitute an underfloor 22 in front of the rear tire 18 with respect to the vehicle.

Then, the spats 30 are provided on the underfloor 16 and the underfloor 22 respectively, and are protruded downward with respect to the vehicle from the underfloor 16 and the underfloor 22 respectively. Besides, the spats 30 are arranged in front of the front tires 12 and the rear tires 18 with respect to the vehicle, respectively. That is, a pair of the spats 30 are provided at the front portion of the vehicle 10, and a pair of the spats 30 are provided at the rear portion of the vehicle 10. Then, the spats 30 constituting each pair are arranged symmetrically with respect to a center of the vehicle 10 in a vehicle width direction.

As shown in FIG. 1, each of the spats 30 is equipped with a main body portion 32. This main body portion 32 is formed in the shape of a column with a substantially U-shaped cross-section, and an upper surface 32A of the main body portion 32 is fixed to each of the underfloor 16 and the underfloor 22. A front straightening portion 34 is formed at a front portion of this main body portion 32. The front straightening portion 34 is in the shape of a concavity that is opened forward with respect to the vehicle in a plan view. Besides, the front straightening portion 34 is configured to include a front inclined surface 36 that constitutes a central portion of the front straightening portion 34 in the vehicle width direction, and a pair of front lateral surfaces 38 that constitute both lateral portions of the front straightening portion 34 in the vehicle width direction respectively.

The front inclined surface 36 is inclined backward with respect to the vehicle with decrease in distance to a lower side of the vehicle in a lateral view, and is formed in the shape of a curved surface that is convex diagonally upward and backward with respect to the vehicle. Then, the curvature radius of the front inclined surface 36 is set to 10 mm to 100 mm. Besides, both end portions 36A of the front inclined surface 36 in the vehicle width direction are inclined in such a direction as to approach each other with decrease in distance to the lower side. That is, a width dimension W1 of the front inclined surface 36 at a lower end thereof is set smaller than a width dimension W2 of the front inclined surface 36 at an upper end thereof.

The pair of the front lateral surfaces 38 extend forward with respect to the vehicle from both the end portions 36A of the front inclined surface 36 in the vehicle width direction, respectively. Concretely, the front lateral surfaces 38 are inclined outward in the vehicle width direction with decrease in distance to the front side of the vehicle in a plan view, and are formed in the shape of a curved surface that is convex diagonally backward and outward in the vehicle width direction. Then, the curvature radius of the front lateral surfaces 38 is set to 10 mm to 100 mm, and the pair of the front lateral surfaces 38 are smoothly connected to the front inclined surface 36.

Next, the operation and effect of the present embodiment of the invention will be described.

When the vehicle 10 to which the spats 30 configured as described above are applied travels, a traveling wind F1 (see FIG. 2) blowing backward with respect to the vehicle flows below the underfloor 16 and the underfloor 22 with respect to the vehicle, and part of the traveling wind F1 (see a traveling wind F2 and a traveling wind F3 shown in FIG. 3) hits the front portion of the main body portion 32 of each of the spats 30.

It should be noted herein that the front straightening portion 34 is formed at the front portion of the main body portion 32, and that the front straightening portion 34 is configured to include the front inclined surface 36 and the pair of the front lateral surfaces 38. Then, the front inclined surface 36 is inclined backward with respect to the vehicle with decrease in distance to the lower side of the vehicle in a lateral view. The front lateral surfaces 38 extend forward with respect to the vehicle from both the end portions 36A of the front inclined surface 36 in the vehicle width direction respectively. That is, the front straightening portion 34 is formed in the shape of a concavity that is opened forward with respect to the vehicle in a plan view.

Then, the traveling wind F2 that has hit the front inclined surface 36 flows downward with respect to the vehicle along the front inclined surface 36. On the other hand, the traveling wind F3 that has hit the pair of the front lateral surfaces 38 flows toward the center side of the front straightening portion 34 (the front inclined surface 36 side) along the front lateral surfaces 38, and merges with the traveling wind F2. Furthermore, the traveling wind F3 that has merged with the traveling wind F2 flows downward with respect to the vehicle along the front inclined surface 36, and the traveling wind F2 and the traveling wind F3 are caused to flow out downward with respect to the vehicle mainly from the lower end of the front inclined surface 36. Therefore, the flow velocities of the traveling wind F2 and the traveling wind F3 that are caused to flow out downward with respect to the vehicle from the lower end of the front straightening portion 34 are higher than in a case, for example, where each of the spats 30 dispenses with the pair of the front lateral surfaces 38. Thus, the traveling wind F2 and the traveling wind F3 that are caused to flow out downward with respect to the vehicle from the lower end of the front straightening portion 34 (the front inclined surface 36) are restrained from flowing toward the rear side of the main body portion 32 with respect to the vehicle. As a result, the traveling wind F2 and the traveling wind F3 are restrained from hitting the front tires 12, the rear tires 18 and the like. Moreover, the traveling wind F2 and the traveling wind F3 that are caused to flow out downward with respect to the vehicle from the lower end of the front straightening portion 34 (the front inclined surface 36) flow downward with respect to the vehicle while engulfing the traveling wind F1 flowing below the main body portion 32 (each of the spats 30) with respect to the vehicle. As a result, the traveling wind F1 flowing below the main body portion 32 with respect to the vehicle is also restrained from hitting the front tires 12, the rear tires 18 and the like. Owing to the foregoing, the air resistance of the vehicle 10 can be reduced.

Figure 4A:
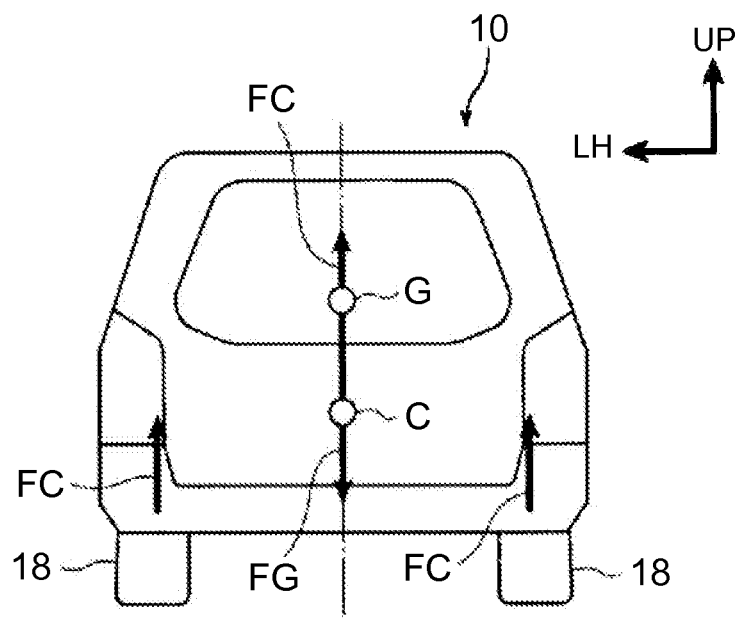
FIG. 4A is an illustrative view for illustrating a force applied to the vehicle shown in FIG. 2 at the time of straight traveling thereof, as viewed from behind the vehicle.

Besides, the flow velocities of the traveling wind F2 and the traveling wind F3 that are caused to flow out downward with respect to the vehicle from the lower end of the front straightening portion 34 (the front inclined surface 36) increase, so a force lifting the vehicle 10 upward (a buoyant force) FC is applied to the vehicle 10 (see FIG. 4(A)). On the other hand, a gravitational force FG is applied to the vehicle 10 downward with respect to the vehicle. Then, the buoyant force FC and the gravitational force FG are counterbalanced by each other by setting the position in the vehicle width direction at a center G of gravity of the vehicle 10 and the position in the vehicle width direction at a center RC of buoyancy (a center of the buoyant force FC) such that they coincide with each other. Thus, the operation stability at the time of straight traveling of the vehicle 10 can be enhanced.

Furthermore, this buoyant force FC is applied to the vehicle 10, so the vehicle 10 is restrained from fluctuating in the vertical direction. In other words, the posture of the vehicle 10 is restrained from changing in the vertical direction. As a result, the riding comfort performance of the vehicle 10 can be enhanced.

Besides, as described above, the front straightening portion 34 is configured to include the front inclined surface 36 and the pair of the front lateral surfaces 38. Therefore, with a simple configuration, the traveling wind F3 can be straightened toward the center side of the front straightening portion 34 in the vehicle width direction, and can be caused to flow out downward with respect to the vehicle from the lower end of the front straightening portion 34 (the front inclined surface 36) together with the traveling wind F2. Besides, the aerodynamic characteristics matching various vehicles can be easily realized by appropriately adjusting the front inclined surface 36 and the pair of the front lateral surfaces 38 of the front straightening portion 34 in a manner corresponding to the various vehicles.

Furthermore, the width dimension W1 of the front inclined surface 36 at the lower end thereof is set smaller than the width dimension W2 of the front inclined surface 36 at the upper end thereof. Therefore, the flow velocities of the traveling wind F2 and the traveling wind F3 that flow downward with respect to the vehicle along the front inclined surface 36 increase due to the Venturi effect. Accordingly, the flow velocities of the traveling wind F2 and the traveling wind F3 that are caused to flow out downward with respect to the vehicle from the lower end of the front straightening portion 34 (the front inclined surface 36) can be further increased. As a result, the traveling wind F1 flowing around each of the spats 30 is drawn to the front side of each of the spats 30 with respect to the vehicle (toward the front straightening portion 34 side), and the traveling wind F2 and the traveling wind F3 can be further restrained from flowing into the rear side of the main body portion 32 with respect to the vehicle. Besides, the flow velocities of the traveling wind F2 and the traveling wind F3 that are caused to flow out downward with respect to the vehicle from the lower end of the front straightening portion 34 further increase, so the engulfment of the traveling wind F2 and the traveling wind F3 by the traveling wind F1 flowing below the main body portion 32 (each of the spats 30) with respect to the vehicle is promoted. Thus, the traveling wind F1 flowing below the main body portion 32 with respect to the vehicle can be further restrained from hitting the front tires 12, the rear tires 18 and the like. Furthermore, the traveling wind F1 flowing around each of the spats 30 is drawn to the front side of each of the spats 30 with respect to the vehicle (the front straightening portion 34 side). Thus, for example, the traveling wind F1 flowing around each of the spats 30 is restrained from being blown out to spaces beside the vehicle 10. As a result, the air in the spaces beside the vehicle 10 can be restrained from becoming turbulent.

Besides, the front inclined surface 36 is formed in the shape of a curved surface that is convex diagonally upward and backward with respect to the vehicle in a lateral view. Therefore, flow components of the traveling wind F2 and the traveling wind F3 that flow along the front inclined surface 36 are flow components flowing mainly downward with respect to the vehicle. Thus, the traveling wind F2 and the traveling wind F3 that flow along the front inclined surface 36 can be efficiently caused to flow downward with respect to the vehicle along the front inclined surface 36.

Furthermore, the front lateral surfaces 38 are formed in the shape of a curved surface that is convex diagonally backward and outward in the vehicle width direction in a plan view. Therefore, the flow component of the traveling wind F3 flowing along each of the front lateral surfaces 38 is the flow component flowing mainly toward the center side of the front straightening portion 34 in the vehicle width direction. Thus, the traveling wind F3 can be efficiently caused to flow toward the front inclined surface 36 side (toward the center side of the front straightening portion 34 in the vehicle width direction) along each of the front lateral surfaces 38.

Besides, the spats 30 are provided in front of the front tires 12 and the rear tires 18 with respect to the vehicle respectively. That is, a pair of the spats 30 are provided at the front portion of the vehicle 10, and a pair of the spats 30 are provided at the rear portion of the vehicle 10. Then, the spats 30 constituting each pair are arranged symmetrically with respect to the center of the vehicle 10 in the vehicle width direction. Thus, the traveling posture of the vehicle 10 can be stabilized with respect to rolling of the vehicle 10.

Figure 4B:
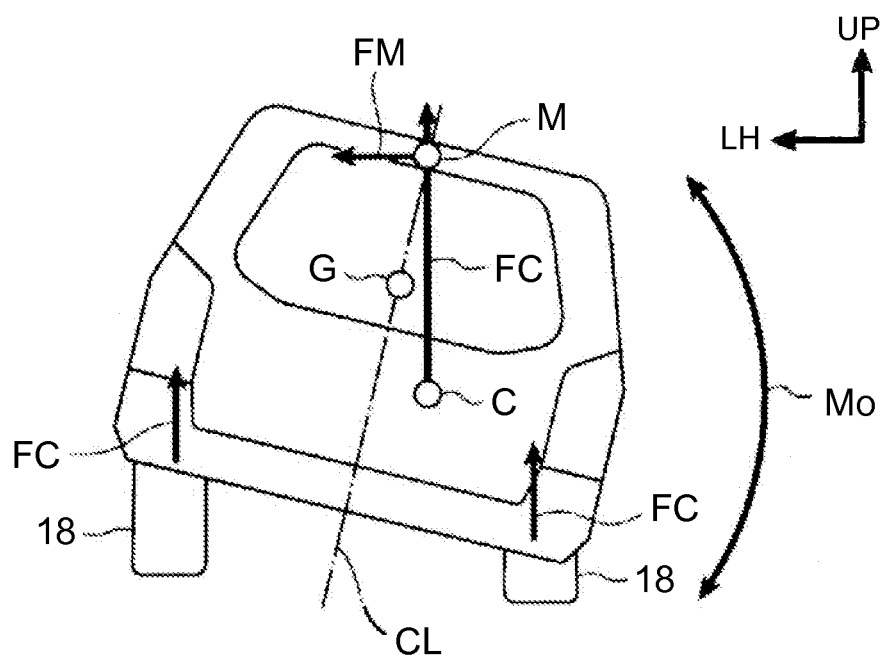
FIG. 4B is an illustrative view for illustrating a force applied to the vehicle shown in FIG. 2 at the time of rolling thereof, as viewed from behind the vehicle.

That is, as shown in FIG. 4(B), the flow velocities of the traveling wind F2 and the traveling wind F3 that are caused to flow out downward with respect to the vehicle from the lower end of the front straightening portion 34 increase, so the buoyant force FC is applied to the vehicle 10 symmetrically with respect to the center of the vehicle 10 in the vehicle width direction. However, at the time of rolling of the vehicle 10, the position of the center C of buoyancy moves as the posture of the vehicle changes. Then, when an angular moment Mo is applied to the vehicle 10 at the time of rolling of the vehicle 10, a restoring force FM is applied to a center M of inclination (a meta center) (an intersection point of a centerline CL of the vehicle 10 in the vehicle width direction and a line of action of the buoyant force FC from the center C of buoyancy). Therefore, the vehicle 10 is about to reassume its original posture due to this restoring force FM, so the traveling posture of the vehicle 10 can be stabilized with respect to rolling of the vehicle 10. As a result, the operation stability of the vehicle 10 can be further enhanced.

Second Embodiment

Figure 5:
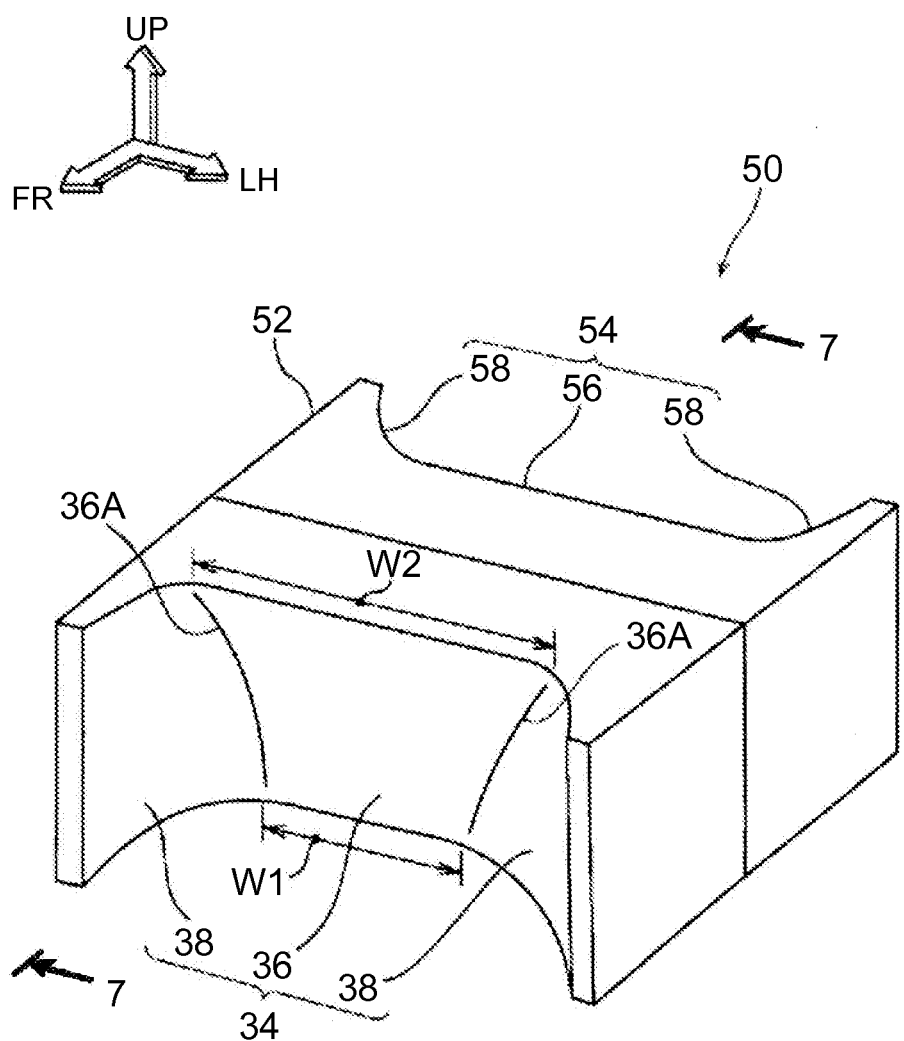
FIG. 5 is a perspective view showing a spat according to the second embodiment of the invention, as viewed diagonally from in front of the left side of a vehicle.
Figure 6:
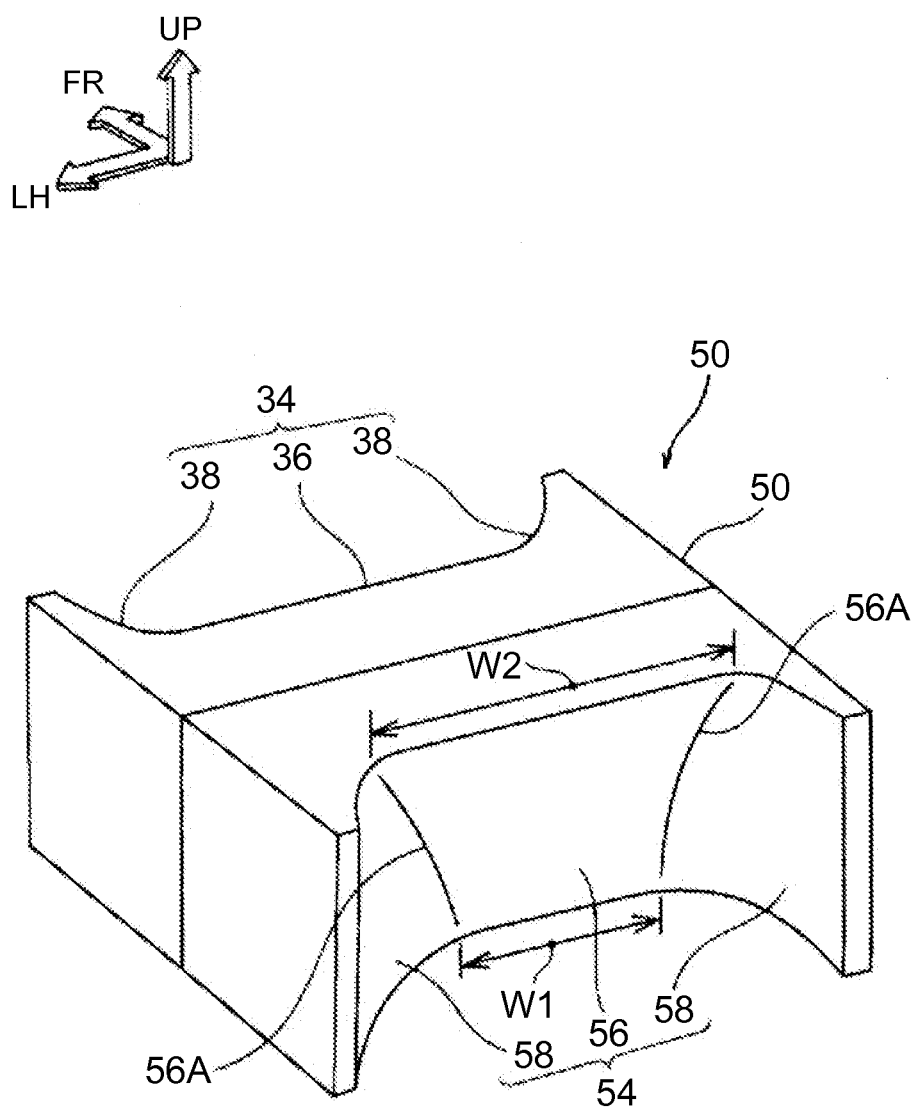
FIG. 6 is a perspective view showing the spat shown in FIG. 5, as viewed diagonally from behind the left side of the vehicle.
Figure 7:
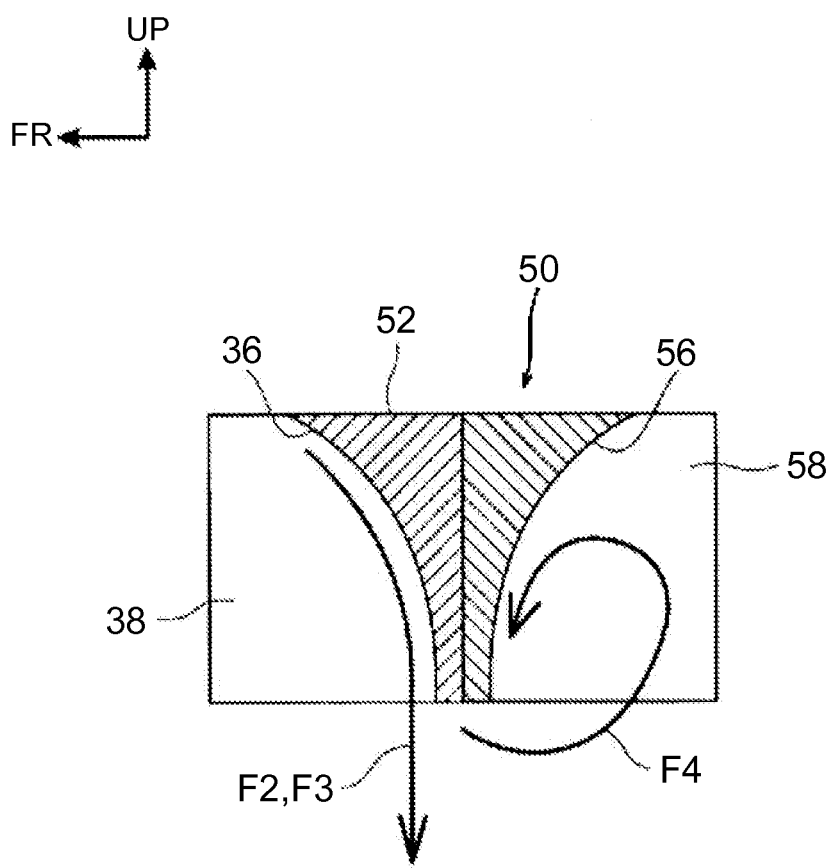
FIG. 7 is a cross-sectional view showing the spat shown in FIG. 5, as viewed from the left side of the vehicle (a cross-sectional view taken along a line 7-7 of FIG. 5).

A spat 50 according to the second embodiment of the invention will be described hereinafter using FIGS. 5 to 7. Incidentally, the second embodiment of the invention is configured in the same manner as the first embodiment of the invention except the shape of the spat 50.

The spat 50 is integrally formed by paring the spats 30 of the first embodiment of the invention. Concretely, the spat 50 is obtained by arranging a pair of the spats 30 symmetrically in the longitudinal direction of the vehicle and linking these spats 30 with each other.

Thus, a main body portion 52 of the spat 50 is formed in the shape of a column with a substantially H-shaped cross-section, and is arranged in front of each of the front tires 12 and the rear tires 18 with respect to the vehicle. Then, the front straightening portion 34 is formed at a front portion of the spat 50. As is the case with the first embodiment of the invention, the front straightening portion 34 is configured to include the front inclined surface 36 and the front lateral surfaces 38.

Besides, a rear portion of the spat 50 is designed as a rear straightening portion 54. The rear straightening portion 54 is configured to include a rear inclined surface 56 that constitutes a central portion of the rear straightening portion 54 in the vehicle width direction, and a pair of rear lateral surfaces 58 that constitute both lateral portions of the rear straightening portion 54 in the vehicle width direction respectively.

The rear inclined surface 56 is arranged behind the front inclined surface 36 with respect to the vehicle, and is formed in the shape of a curved surface that is inclined backward with respect to the vehicle with decrease in distance to an upper side of the vehicle in a lateral view and that is convex diagonally upward and forward with respect to the vehicle. Then, the curvature radius of the rear inclined surface 56 is set to 10 mm to 100 mm. Besides, both end portions 56A of the rear inclined surface 56 in the vehicle width direction are inclined in such a direction as to approach each other with decrease in distance to the lower side. The width dimension of the rear inclined surface 56 at the lower end thereof is made to coincide with W1, and the width dimension of the rear inclined surface 56 at the upper end thereof is made to coincide with W2.

The pair of the rear lateral surfaces 58 extend backward with respect to the vehicle from both end portions 56A of the rear inclined surface 56 in the vehicle width direction respectively. Concretely, the rear lateral surfaces 58 are formed in the shape of a curved shape that is inclined outward in the vehicle width direction with decrease in distance to the rear side of the vehicle in a plan view and that is convex diagonally forward and outward in the vehicle width direction. Then, the curvature radius of the rear lateral surfaces 58 is set to 10 mm to 100 mm. The pair of the rear lateral surfaces 58 are smoothly connected to the rear inclined surface 56.

Thus, an operation and an effect similar to those of the first embodiment of the invention are achieved in the second embodiment of the invention as well.

Besides, in the second embodiment of the invention, the rear inclined surface 56 is arranged behind the front inclined surface 36 with respect to the vehicle, and the rear inclined surface 56 is formed in the shape of a curved surface that is inclined backward with respect to the vehicle with decrease in distance to the upper side of the vehicle in a lateral view and that is convex diagonally upward and forward with respect to the vehicle. Therefore, as shown in FIG. 7, if parts of the traveling wind F2 and the traveling wind F3 (hereinafter referred to as a traveling wind F4) that are caused to flow out from the lower end of the front straightening portion 34 (the front inclined surface 36) flow in an engulfing manner into the rear side of the main body portion 52 with respect to the vehicle, the traveling wind F4 is adsorbed by the rear inclined surface 56, and flows toward the lower end of the rear inclined surface 56 along the rear inclined surface 56. Then, when the traveling wind F4 reaches the lower end of the rear inclined surface 56, the flow velocity of the traveling wind F4 decreases, and the traveling wind F4 is converged at a lower end portion of the rear inclined surface 56. Thus, the traveling wind F4 is restrained from flowing out from the lower end of the rear inclined surface 56. Accordingly, even if the traveling wind F4 flows into the rear side of the main body portion 52 with respect to the vehicle, it is possible to restrain the traveling wind F4 from hitting the front tires 12, the rear tires 18 and the like. As a result, the air resistance of the vehicle 10 can be further reduced.

Incidentally, in the second embodiment of the invention, the spat 50 is configured by linking a pair of the spats 30 of the first embodiment of the invention with each other. That is, the spat 50 is constituted of two members. Instead, the spat 50 may be constituted by a single member.

Besides, in the first embodiment of the invention, the spats 30 are arranged in front of the front tires 12 and the rear tires 18 with respect to the vehicle respectively. Instead, the spats 30 may be inversed the longitudinal direction of the vehicle and arranged behind the front tires 12 and the rear tires 18 with respect to the vehicle (e.g., at rear end portions of the front fender liners 14 and the rear fender liners 20) respectively. In this case, even if part of a traveling wind that has flowed out of the lower end of each of the spats 50 flows into a rear side of each of the spats 50 with respect to the vehicle behind each of the front tires 12 and the rear tires 18 with respect to the vehicle, the traveling wind can be straightened by the rear inclined surface 56 and converged.

Furthermore, in each of the first embodiment of the invention and the second embodiment of the invention, the spats 30 or the spats 50 are arranged in front of the front tires 12 and the rear tires 18 with respect to the vehicle respectively. However, the spats 30 or the spats 50 may be arranged in front of either the front tires 12 or the rear tires 18 with respect to the vehicle respectively.

Besides, in each of the first embodiment of the invention and the second embodiment of the invention, the front inclined surface 36 of each of the spats 30 and the spats 50 is formed in the shape of a curved surface that is convex diagonally upward and backward with respect to the vehicle in a lateral view, but the shape of the front inclined surface 36 is not limited thereto. For example, the front inclined surface 36 may be constituted of a plurality of flat surfaces, and the entire front inclined surface 36 may be curved to be convex diagonally upward and backward with respect to the vehicle in a lateral view. Besides, the front inclined surface 36 may be inclined in the manner of a flat surface backward with respect to the vehicle with decrease in distance to the lower side of the vehicle in a lateral view.

Furthermore, in each of the first embodiment of the invention and the second embodiment of the invention, the front lateral surfaces 38 of each of the spats 30 or the spats 50 are curved to be convex diagonally backward and outward in the vehicle width direction in a plan view, but the shape of the front lateral surfaces 38 is not limited thereto. For example, each of the front lateral surfaces 38 may be constituted of a plurality of flat surfaces, and the entire front lateral surfaces 38 may be curved to be convex diagonally backward and outward in the vehicle width direction in a plan view. Besides, the front lateral surfaces 38 may be inclined in the manner of a flat surface forward with respect to the vehicle with decrease in distance to the outside in the vehicle width direction in a plan view.

Besides, in each of the first embodiment of the invention and the second embodiment of the invention, the width dimension W1 of the front inclined surface 36 at the lower end thereof is set smaller than the width dimension W2 of the front inclined surface 36 at the upper end thereof. Instead, the width dimension W1 of the front inclined surface 36 and the width dimension W2 of the front inclined surface 36 may be set equal to each other. That is, both the end portions 36A of the front inclined surface 36 in the vehicle width direction may be so arranged as to extend along the vertical direction as viewed from in front of the vehicle.

Furthermore, in the second embodiment of the invention, the rear inclined surface 56 of the spat 50 is formed in the shape of a curved surface that is convex diagonally upward and forward with respect to the vehicle in a lateral view, but the shape of the rear inclined surface 56 is not limited thereto. For example, the rear inclined surface 56 may be constituted of a plurality of flat surfaces, and the entire rear inclined surface 56 may be curved to be convex diagonally upward and forward with respect to the vehicle in a lateral view. Besides, the rear inclined surface 56 may be inclined in the manner of a flat surface backward with respect to the vehicle with decrease in distance to the upper side of the vehicle in a lateral view.

The invention claimed is:
1. A straightening device for a vehicle, the straightening device comprising:
  a main body portion being provided in front of a wheel with respect to a vehicle at a lower portion of the vehicle, and being protruded downward with respect to the vehicle from an underfloor;
  a front straightening portion being formed at a front portion of the main body portion, the front straightening portion being configured to straighten a traveling wind hitting the front portion toward a center side of the front portion in a width direction of the vehicle and to cause the traveling wind to flow out downward with respect to the vehicle; and
  a rear straightening portion being formed at a rear portion of the main body portion,
  wherein
  a central portion of the front straightening portion in the width direction of the vehicle is a front inclined surface,
  the front inclined surface is inclined backward with respect to the vehicle with decrease in distance to a lower side of the vehicle in a lateral view,
  both lateral portions of the front straightening portion in the width direction of the vehicle are front lateral surfaces,
  the front lateral surfaces extend forward with respect to the vehicle from both end portions of the front inclined surface in the width direction of the vehicle respectively,
  the rear straightening portion is configured to include a rear inclined surface, and
  the rear inclined surface is arranged behind the front inclined surface with respect to the vehicle, and
  the rear inclined surface is inclined backward with respect to the vehicle with decrease in distance to an upper side of the vehicle in a lateral view.

2. The straightening device according to claim 1, wherein a width dimension of the front inclined surface at a lower end thereof is set smaller than a width dimension of the front inclined surface at an upper end thereof.

3. The straightening device according to claim 1, wherein the front inclined surface is formed in a shape of a curved surface that is convex diagonally upward and backward with respect to the vehicle in a lateral view.

4. The straightening device according to claim 1, wherein each of the front lateral surfaces is formed in a shape of a curved surface that is convex diagonally backward and outward in the width direction of the vehicle in a plan view.

5. The straightening device according to claim 1, wherein a pair of the main body portions are provided symmetrically with respect to a center of the vehicle in the width direction of the vehicle.

* * * * *